United States Patent [19]
Golinelli

[11] Patent Number: 5,088,206
[45] Date of Patent: Feb. 18, 1992

[54] APPARATUS AND METHOD FOR CHECKING MECHANICAL PARTS

[75] Inventor: Guido Golinelli, Bologna, Italy

[73] Assignee: Marposs Societa' per Azioni, S. Marino di Bentivoglio, Italy

[21] Appl. No.: 543,815

[22] PCT Filed: Mar. 22, 1989

[86] PCT No.: PCT/EP89/00315
 § 371 Date: Jul. 24, 1990
 § 102(e) Date: Jul. 24, 1990

[87] PCT Pub. No.: WO89/10531
 PCT Pub. Date: Nov. 2, 1989

[30] Foreign Application Priority Data
 Apr. 26, 1988 [IT] Italy .................. 3432 A/88

[51] Int. Cl.⁵ .............. G01B 5/25; G01B 7/28; G01B 7/31
[52] U.S. Cl. ............... 33/550; 33/555.1; 33/557; 33/520
[58] Field of Search ........... 33/549, 550, 555.1, 33/555.2, 555.3, 557, 520, 805, 501.02, 501.03, 501.04

[56] References Cited
U.S. PATENT DOCUMENTS

| | | | |
|---|---|---|---|
| 3,795,055 | 3/1974 | Zucco | 33/550 |
| 3,869,800 | 3/1975 | Bartlett et al. | 33/555.1 |
| 4,594,757 | 6/1986 | Johnson, Jr. | 33/550 |
| 4,601,109 | 7/1986 | Klingler et al. | 33/549 |
| 4,674,193 | 6/1987 | Wertepny et al. | 33/550 |
| 4,914,827 | 4/1990 | Cook | 33/549 |

FOREIGN PATENT DOCUMENTS

| | | | |
|---|---|---|---|
| 2000005 | 7/1971 | Fed. Rep. of Germany | 33/550 |
| 3808549 | 9/1989 | Fed. Rep. of Germany | 33/555.1 |
| 2534682 | 4/1984 | France | |
| 0038501 | 2/1986 | Japan | 33/555.1 |
| 0102107 | 5/1987 | Japan | 33/555.1 |
| 8601885 | 3/1986 | PCT Int'l Appl. | 33/555.1 |
| 1357324 | 6/1974 | United Kingdom | 33/550 |

OTHER PUBLICATIONS

A. Taniguchi, Patent Abstracts of Japan, vol. 7, No. 35 (P-175) [1180], 2/10/83.
Y. Koyama, Patent Abstracts of Japan, vol. 10, No. 300 (P-506) [2356], 10/14/86.

*Primary Examiner*—William A. Cuchlinski, Jr.
*Assistant Examiner*—Alvin Wirthlin
*Attorney, Agent, or Firm*—Stevens, Davis, Miller & Mosher

[57] ABSTRACT

The geometrical features of a part (6) having center seats are electronically checked by processing signals of gauging heads (14–17) that relate to linear dimensions of the part together with signals of other gauging heads (30, 31) adapted to define a reference geometrical axis. In order to obtain checkings of high accuracy, the reference geometrical axis is defined by means of two gauging heads (30, 31), each of which has a feeler (67, 72) movable along the three directions that is adapted to cooperate with a respective center seat.

11 Claims, 2 Drawing Sheets

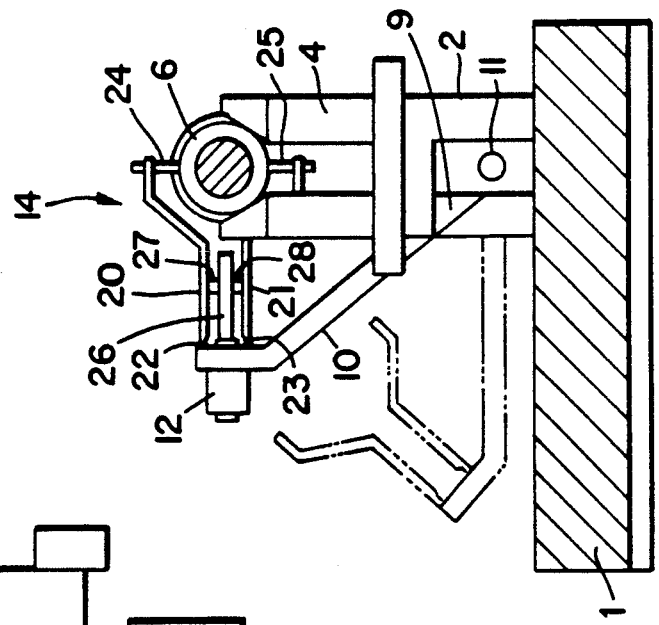
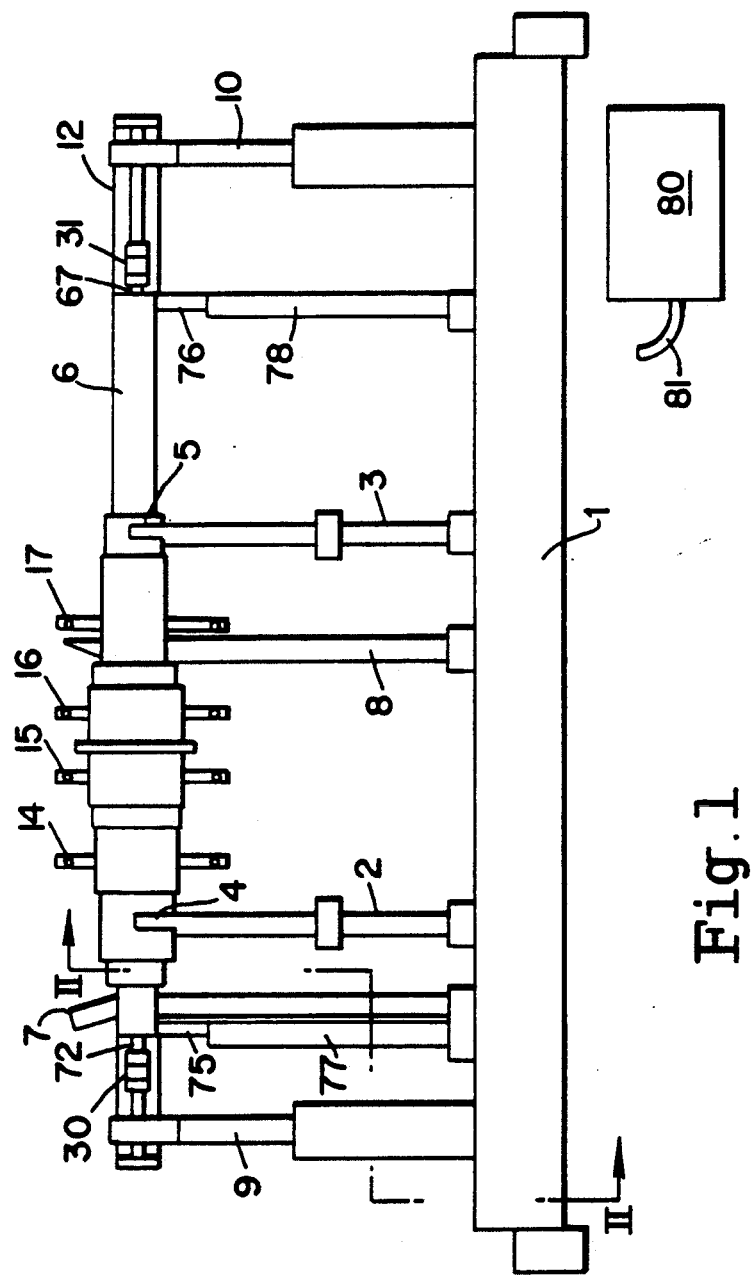

APPARATUS AND METHOD FOR CHECKING MECHANICAL PARTS

TECHNICAL FIELD

The invention relates to an apparatus for checking geometrical features of mechanical parts with symmetry of rotation and having two centre seats, with first supporting means for supporting the part to be checked, by cooperating with it at positions different from said seats; second supporting means; gauging means fixed to the second supporting means and adapted to cooperate with the part; and processing means connected with the gauging means for determining said geometrical features.

The invention also relates to a method, for checking the concentricity of cross-sections of a part having symmetry of rotation and featuring at its ends centre seats, according to which centres of said cross-sections are automatically determined by electronically processing the signals of gauging heads for measuring linear dimensions, a reference geometrical axis is electronically defined and the distances of said centres from the reference geometrical axis are determined.

BACKGROUND ART

It is known to check, statically or dynamically (i.e. with the part being stationary or in rotation), the concentricity of different cross-sections of mechanical parts with symmetry of rotation, in particular shafts, with reference to a geometrical axis defined by a totally mechanical manner.

The geometrical axis is normally defined by two precision centres (with relevant support devices) that cooperate with the corresponding seats obtained at the ends of the shaft for permitting support and rotation of the latter during the subsequent machining phases (turning, grinding, etc.). One of the centres can be motorized, for performing dynamical checkings.

In several cases, from a theoretical point of view it is more correct to take as a reference the geometrical axis defined by the centre seats, but it is difficult and expensive to make high precision centres and relevant support devices, for preventing displacements of said geometrical axis with respect to the gauging devices or heads that perform dimensional measurements in correspondence with the different cross-sections of the shaft.

Therefore, in other cases the checking is performed by taking as a reference a geometrical axis defined as the axis passing through the centres of two cross-sections of the part. For example, for a crankshaft, the reference axis can be determined by processing the signals of two gauging heads each of which has two feelers in contact with a respective journal for determining two radial dimensions of the journal along the same diametral direction.

The signals of these gauging heads are combined with those of further gauging heads that check other radial dimensions of the part. The part can be supported by Vee supporting devices or also by low precision centres, since possible spatial displacements of the axis of instantaneous rotation of the part are electronically compensated.

However, as already mentioned, sometimes the measurement problems require to take as a reference the axis defined by the seats for the supporting centres, in particular for inter-operational checkings of the machining process.

DISCLOSURE OF INVENTION

Object of the invention is to permit checking of geometrical features, such as concentricity, of parts with symmetry of rotation, e.g. shafts, with reference to a geometrical axis defined by the relevant centre seats, while guaranteeing high repeatability and accuracy, without any need of supporting the part by high precision centres and relevant supports.

The invention as characterized in the claims solves the problem of determining in an electronic way the position of the geometrical axis of a part with symmetry of rotation as defined by the relevant centre seats, while the part is supported by supporting devices different from the centres.

Since the position of the axis defined by the centre seats is readily and continuously determined, possible displacements of the same axis can be compensated. Therefore the part can be supported and rotated by low precision devices. It is possible to detect displacements of said axis along one or two coordinates. Moreover, it is quite easy to complete the apparatus and the method according to the invention in such a way as to check the distance between the centre seats.

BRIEF DESCRIPTION OF DRAWINGS

The invention is now described in detail with reference to a preferred embodiment, illustrated in the annexed drawings, given as a non limiting example only, in which:

FIG. 1 is a schematic front view of a gauging bench for checking dimensions and geometrical features of shafts;

FIG. 2 is a schematic cross-section of the bench of FIG. 1, along path II—II in FIG. 1;

BEST MODE FOR CARRYING OUT THE INVENTION

Figure 4:
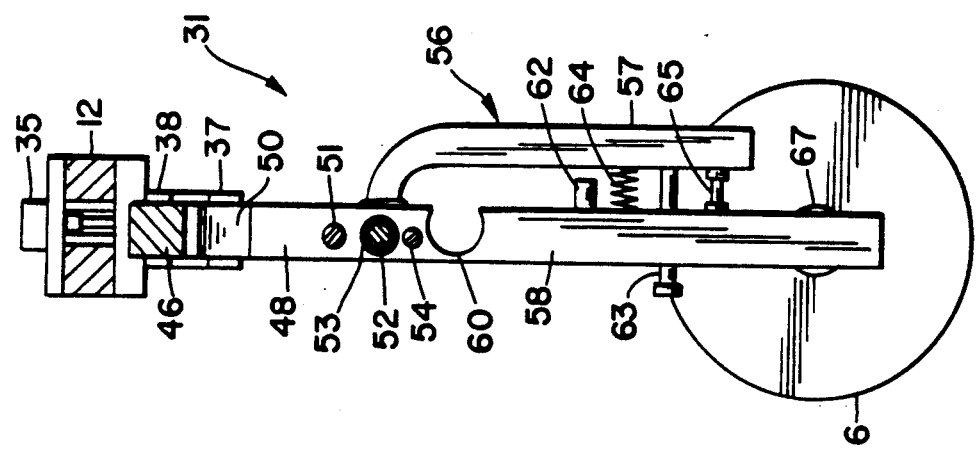
FIG. 4 is a cross-section of the detail of FIG. 3 according to the plane along path IV—IV in FIG. 3.

The gauging bench of FIG. 1 comprises first supporting means including a base 1, that supports, through vertical supports 2 and 3, two Vee devices, 4 and 5, for supporting and providing a reference to the parts to be checked. In the specific case, the parts are constituted by shafts 6 comprising a plurality of sections having diameters of different values.

Shaft 6 is inserted from above onto Vee devices 4, 5. The loading of part 6 can be manual or automatic and is rendered easier by guiding elements 7, 8 that are also fixed to base 1.

Two arms 9, 10, rotatable about horizontal axes or pins 11 arranged under shaft 6 (when shaft 6 is in the measurement position), see FIG. 2 have free ends coupled to second supporting means including a supporting and guiding frame 12.

Frame 12 supports measuring means comprising gauging heads 14, 15, 16 and 17, each having two feelers adapted to enter into contact with diametrically opposite points of shaft 6.

By way of example, as shown in FIG. 2, gauging head 14 comprises two arms 20, 21 movable about integral fulcrums 22, 23 and carrying at their ends feelers 24, 25. To each movable arm 20, 21 and to an intermediate support 26 there are coupled elements of two position transducers 27, 28, that provide measurement signals responsive to the deviations, from the nominal value, of the radiuses of the section of shaft 6 corresponding to feelers 24, 25.

Arms 9, 10 are coupled to other arms carrying control knobs, but this is not shown, for simplicity's sake. The rest and operating positions of arms 9, 10, with the corresponding gauging heads 14–17, are defined by mechanical stops, not shown. The rest position is partially shown in FIG. 2 by short dashes.

Figure 3:
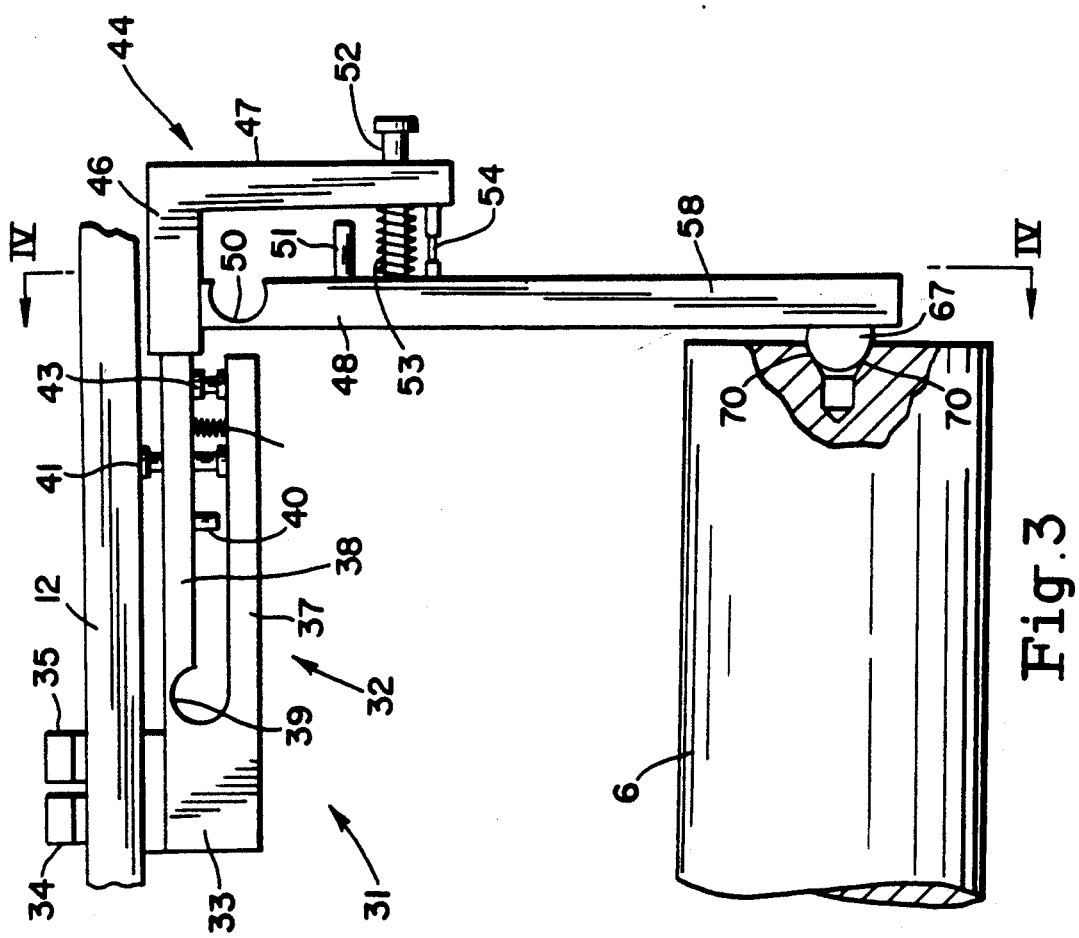
FIG. 3 is a plan view, with enlarged scale, of a detail of the bench of FIGS. 1 and 2, comprising a gauging cell with a feeler adapted to cooperate with a centre seat of a shaft.
Figure 4:
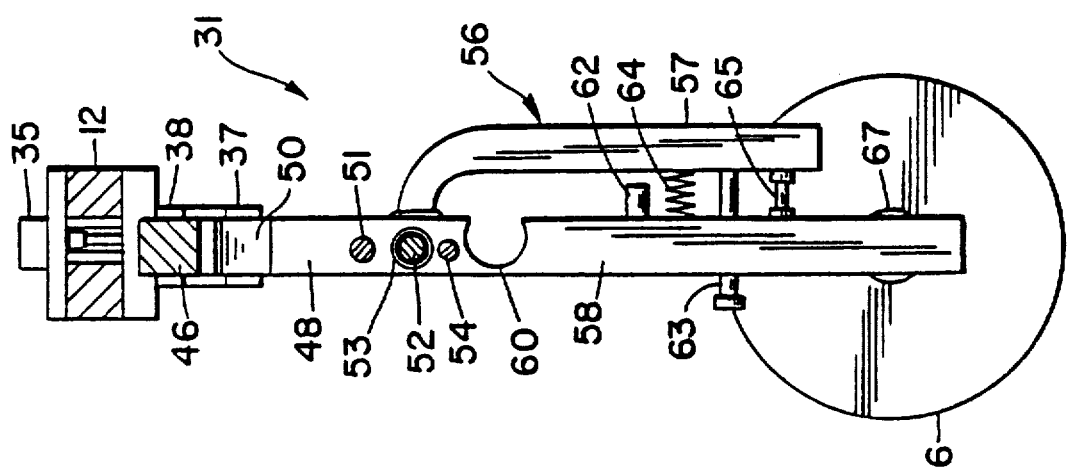
Figure 3:
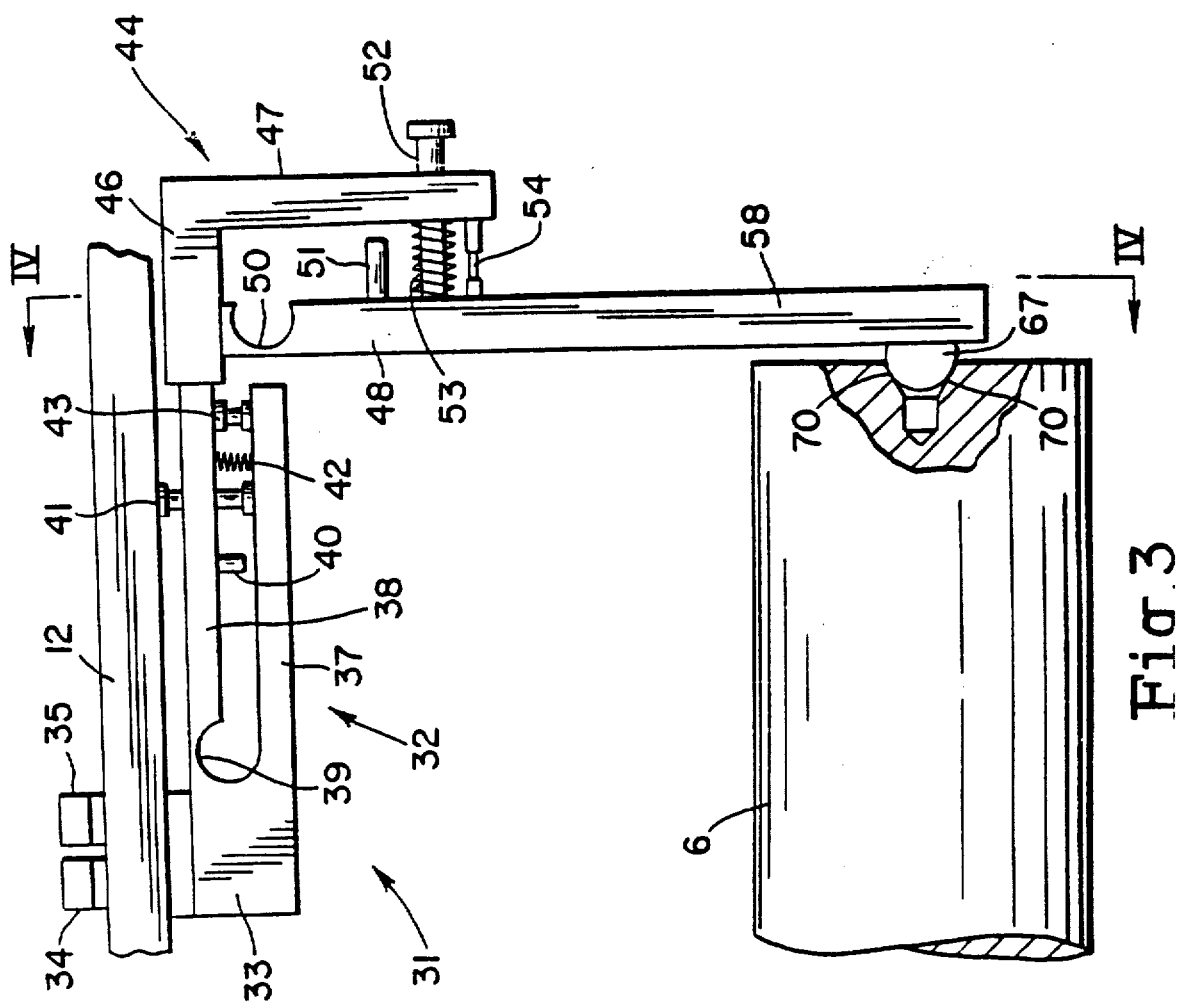

The measuring means carried by frame 12 also comprise two gauging cells 30, 31, the second of which is more clearly shown in FIGS. 3 and 4.

Gauging cell 31, similarly to cell 30, is a three axis gauging cell, or—more properly—a cell featuring three degrees of freedom.

A first portion 32 of cell 31 comprises a base 33 fixed to frame 12 by screws 34, 35. Portion 32 also includes two arms 37, 38 integrally connected to base 33. Arm 37 is fixed with respect to base 33, while arm 38 can perform limited rotational displacements about a geometrical axis—perpendicular to the plane of FIG. 3 and parallel to the plane of FIG. 4—defined by a section having reduced thickness, or integral fulcrum 39.

The mutual displacements of arms 37, 38 are limited by limiting devices 40, 41.

The mutual rest position of arms 37, 38 is determined, among other things, by a spring 42. The deviations of arm 38 from this rest position are measured by a position transducer 43 having two parts respectively connected to arms 37, 38.

A second portion 44 of cell 31 is connected to the free end of arm 38 in an integral way (or through screw devices and/or welding). Portion 44 comprises a base 46 and an arm 47 fixed with respect to arm 38 and an arm 48 that can perform limited rotational displacements about a geometrical axis, arranged perpendicularly to the plane of FIG. 3 and, with reference to FIG. 4, lying horizontally and in the plane of the same FIG. 4. This geometrical axis is defined by a section having reduced thickness, or integral fulcrum 50.

Coupled to arms 47, 48 are two limiting devices 51, 52, a spring 53 coupled to limiting device 52 and a position transducer 54.

A third portion 56 of cell 31 comprises an arm 57 integrally and rigidly secured to arm 48 and an arm 58 integrally joined to arm 48 through a section having reduced thickness, or integral fulcrum 60. Integral fulcrum 60 defines a rotation geometrical axis arranged, with reference to FIG. 3, horizontally and substantially in the plane of the same FIG. 3 and, with reference to FIG. 4, perpendicularly to the plane of FIG. 4.

Coupled to arms 57, 58 are two limiting devices 62, 63, a spring 64 and a position transducer 65.

A feeler 67 having a hemisphere shape is fixed at the end of movable arm 58.

The diameter of the hemisphere defining feeler 67 has a pre-set value such as to enable the proper cooperation with the end 70, having the shape of a truncated cone, of a centre seat ("centre") obtained at an end of shaft 6.

The operation of the bench of FIGS. 1–4 is as follows.

With arms 9, 10, frame 12, gauging heads 14–17 and cells 30, 31 in rest position, shaft 6 is horizontally loaded onto supporting devices 4 and 5.

Arms 9, 10 and the other elements associated with them are displaced to the operating position by controlling the previously mentioned knobs. Consequently, feeler 67 and a corresponding feeler 72 (visible in FIG. 1) of cell 30 enter into seat 70 and into another centre seat ("centre") obtained at the other end of shaft 6. The insertion of feelers 67, 72 is guided by two reference devices 75, 76, visible in FIG. 1, fixed to supporting devices 77, 78 coupled to base 1. Reference devices 75, 76 also define the rest position of feelers 67, 72.

Of course, also the feelers of gauging heads 14–17 reach the measuring position, into contact with diametrically opposite points of corresponding cross-sections of shaft 6.

Then shaft 6 is driven into rotation (through at least 360°) manually (or possibly by a motorized device) on supporting devices 4, 5. During this rotation transducers 43 and 65 and the corresponding transducers of gauging cell 30 detect possible displacements—along two perpendicular geometrical axes lying in a plane perpendicular to the geometrical axis of shaft 6—of the geometrical axis of shaft 6 defined by the cooperation among feelers 67, 72 and the corresponding centre seats of shaft 6.

Transducer 54 and the corresponding transducer of gauging cell 30 permit checking deviations of the length of shaft 6, in correspondence with the centre seats, from the nominal value, through per se known processing of the relevant signals in processing means comprising a processing and display unit 80, shown in FIG. 1.

This unit 80 also receives, through conductors housed within a cable 81, the signals of the transducers of gauging heads 14–17 and the signals of the other transducers of gauging cells 30 and 31. By processing in a known way these signals it is possible to obtain the deviations of the diameters of the various sections of shaft 6 from the corresponding nominal values and the components of the possible concentricity errors of the centres of the same sections with respect to the geometrical axis defined by feelers 67 and 72.

Gauging cells 30 and 31 guarantee high accuracy, because the displacements of the feelers 67 and 72—that substantially take place along three perpendicular directions and therefore, by composition, in the space—are obtained through integral fulcrums, without plays and friction. Only the contact of feelers 67 and 72 with the corresponding centre seats involves friction, the influence of which can however be rendered negligible by a suitable design and the precision machining of gauging cells 30 and 31.

Of course, gauging cells 30 and 31 can be provided with a single transducer whenever it is sufficient to measure one component of the displacements of the axis defined by the centre seats, or with two transducers if it is needed to measure the two components of these displacements, or one component and the length of shaft 6.

I claim:

1. Apparatus for checking geometrical features of a mechanical part with symmetry of rotation and having two end centers, with first supporting means (1–5) for supporting the part to be checked, by cooperating with it at positions different from said end centers; second supporting means (12); gauging means (14–17, 30, 31) fixed to the second supporting means and adapted to cooperate with the part (6); and processing means (80) connected with the gauging means (14–17, 30, 31) for determining said geometrical features, wherein said gauging means comprise two gauging heads (30, 31), each of which has a base fixed to the second supporting means and a feeler (67, 72) movable substantially in three orthogonal directions with respect to the base and adapted to cooperate with a corresponding one of said end centers (70), the processing means (80) being connected to said gauging heads (30, 31) for determining the position of the geometrical axis of the part defined by said end centers.

2. An apparatus according to claim 1, wherein the first supporting means (1-5) comprise Vee reference devices (4, 5) adapted to support the part (6) and permit its rotation.

3. An apparatus according to claim 1, wherein said gauging means (14-17, 30, 31) comprise further gauging heads (14-17) adapted to provide measurement signals for combined checkings and the second supporting means comprise a common support (12) for said two gauging heads and the further gauging heads.

4. An apparatus according to claim 3, wherein said further gauging heads (14-17) provide signals responsive to at least two radial dimensions of the part (6) in correspondence with a diametrical direction in a cross-section of the part, and said two gauging heads (30, 31) provide signals responsive to displacements of said axis of the part along said diametrical direction, the processing means (80) being adapted to process the signals of said further gauging heads (14-17) and of the two gauging heads (30, 31), for measuring concentricity errors of said cross-section with respect to said axis of the part.

5. An apparatus according to claim 1, wherein each of said two gauging heads (30, 31) comprises position transducer means (43, 54, 65) for detecting displacements of the corresponding feeler (67) along at least one of said three directions.

6. An apparatus according to claim 1, wherein each of the two gauging heads (30, 31) comprises two position transducers (43, 54, 65) for detecting displacements of the feeler (67) substantially along the direction of the geometrical axis of the part (6) and along a direction perpendicular thereto.

7. An apparatus according to claim 6, wherein the processing means (80) are adapted to check the length of the part (6) in correspondence with the feelers (67, 72) of said two gauging heads (30, 31).

8. An apparatus according to claim 1, for checking the part (6) in which said end centers have a conical surface (70), wherein said feelers (62, 72) have a substantially spheric shape for guaranteeing centering with respect to the conical surfaces of the end centers.

9. An apparatus according to claim 1, wherein the processing means (80) are adapted to check said geometrical features with the part rotating on the first supporting means (1-5).

10. An apparatus for checking geometrical features of a mechanical part with symmetry of rotation and having two end centers, with first supporting means (1-5) for supporting the part to be checked by cooperating with it at positions different from said end centers; second supporting means (12); gauging means (14-17; 30, 31) fixed to the second supporting means and adapted to cooperate with the part (6); and processing means (80) connected with the gauging means (14-17; 30, 31) for determining said geometrical features, wherein each of said gauging means comprises two gauging heads (30, 31), each of which has a feeler (67, 72) adapted to cooperate with a corresponding one of said end centers (70), the feeler being movable substantially in three directions, a movable arm carrying the feeler, the movable arm being coupled to the base through three integral fulcrums (39, 50, 60) for permitting, respectively, the displacements of the feeler along said three directions, the processing means (80) being connected to said gauging heads (30, 31) for determining the positions of the geometrical axis of the part defined by said end centers.

11. A method for checking the concentricity of cross-sections of a part, the part (6) having a shape with symmetry of rotation and being provided with end centers, including the steps of: arranging the part in a determined measurement position by supporting it at locations different from said end centers; measuring linear dimensions of the part at said cross-sections by first gauging means (14-17) providing electronic measurement signals; electronically processing said measurement signals for detecting the centers of said cross-sections; electronically determining a geometrical reference axis by directly detecting the positions of the end centers by two gauging heads (30, 31), each gauging head having a base and a feeler directly contacting one of the end centers, the feeler being movable with respect to the base along three substantially orthogonal measurement directions; and determining the distances of the centers of said cross-sections from said geometrical axis.

* * * * *

UNITED STATES PATENT AND TRADEMARK OFFICE
CERTIFICATE OF CORRECTION

PATENT NO. : 5,088,206
DATED : February 18, 1992
INVENTOR(S) : Guido GOLINELLI

It is certified that error appears in the above-identified patent and that said Letters Patent is hereby corrected as shown below:

Column 2, line 60, "position), see FIG. 2" should read
--position, see FIG. 2)--.

Drawing Figure 3 should be deleted to appear as per attached

Signed and Sealed this

Third Day of August, 1993

Attest:

MICHAEL K. KIRK

Attesting Officer     Acting Commissioner of Patents and Trademarks